E. G. STAMPER.
COMBINED STERILIZER AND WATER HEATER.
APPLICATION FILED MAR. 3, 1909.

963,726.

Patented July 5, 1910.

2 SHEETS—SHEET 1.

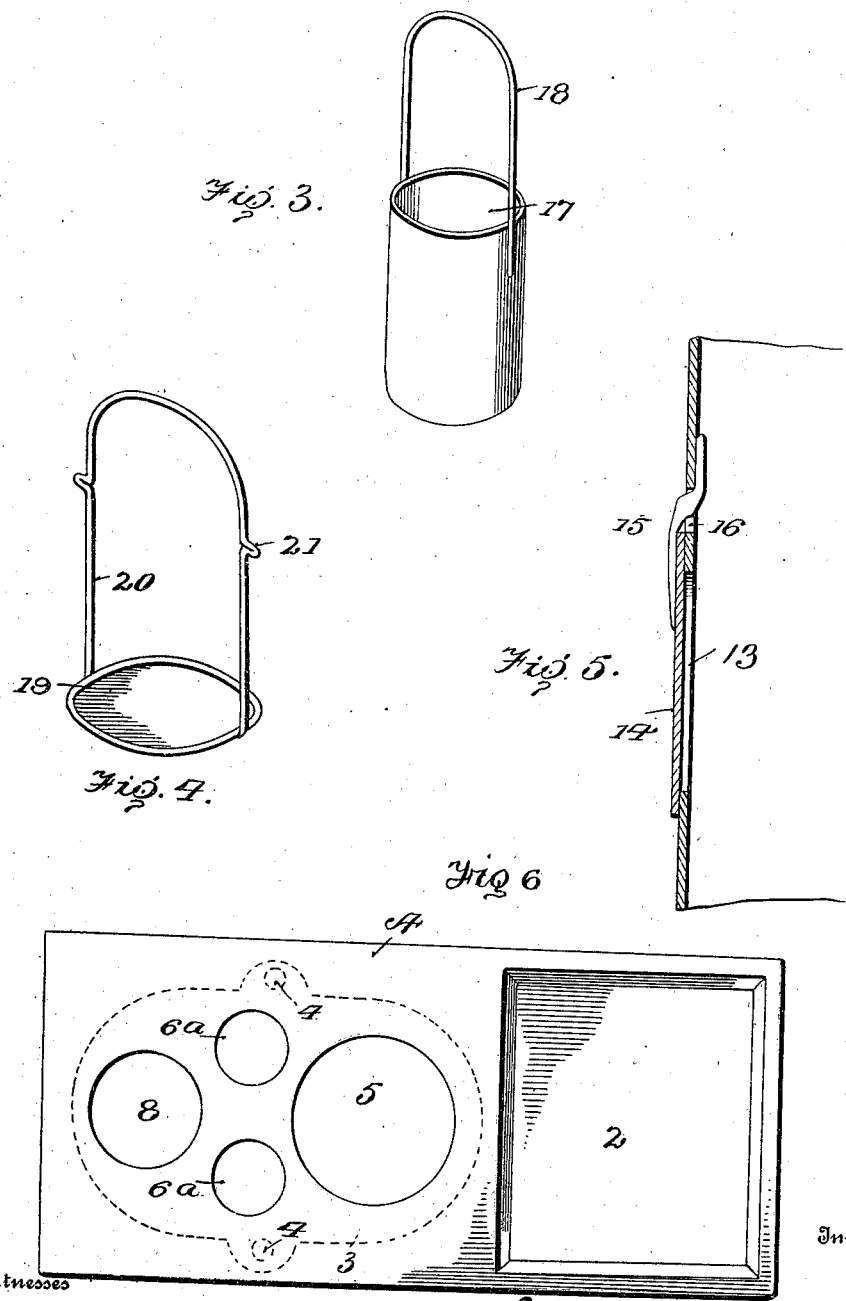

UNITED STATES PATENT OFFICE.

ELBRIDGE G. STAMPER, OF PADUCAH, KENTUCKY, ASSIGNOR TO THE PADUCAH STERILIZER MFG. CO., OF PADUCAH, KENTUCKY, A CORPORATION OF KENTUCKY.

COMBINED STERILIZER AND WATER-HEATER.

963,726.  Specification of Letters Patent.  Patented July 5, 1910.

Application filed March 3, 1909. Serial No. 481,032.

*To all whom it may concern:*

Be it known that I, ELBRIDGE G. STAMPER, a citizen of the United States, residing at Paducah, in the county of McCracken and State of Kentucky, have invented certain new and useful Improvements in Combined Sterilizers and Water-Heaters, of which the following is a specification.

My invention relates to an improvement in a combined sterilizer and water heater, the object being to provide a device whereby dental instruments may be sterilized, spraying bottles heated, and different articles heated for different purposes for dentists' use.

This invention is an improvement on my Patent No. 897,171, granted to me August 25, 1908.

The invention consists of certain novel features of construction and combinations of parts which will be hereinafter fully described and pointed out in the claim.

Figure 1:
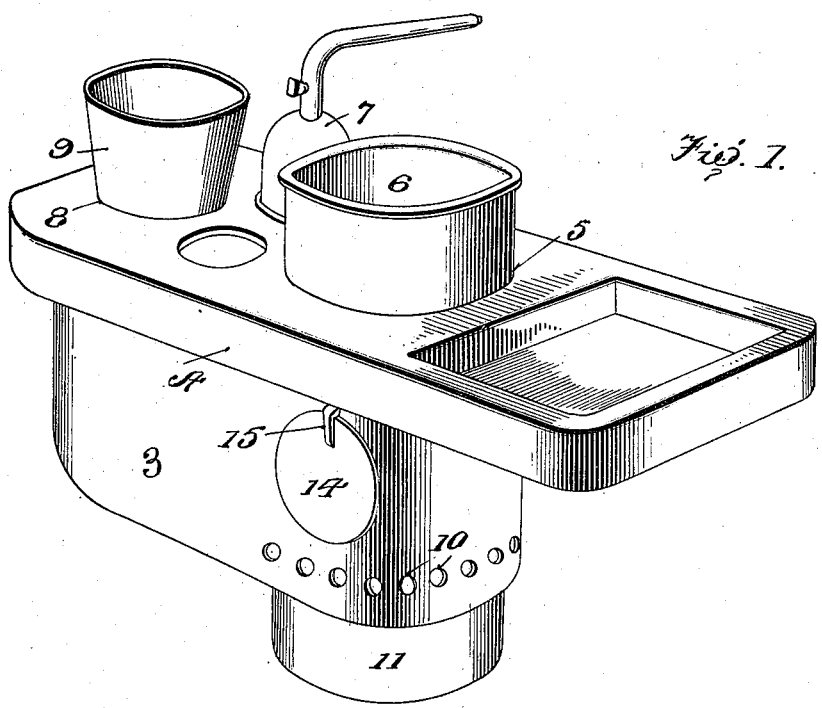
Figure 2:
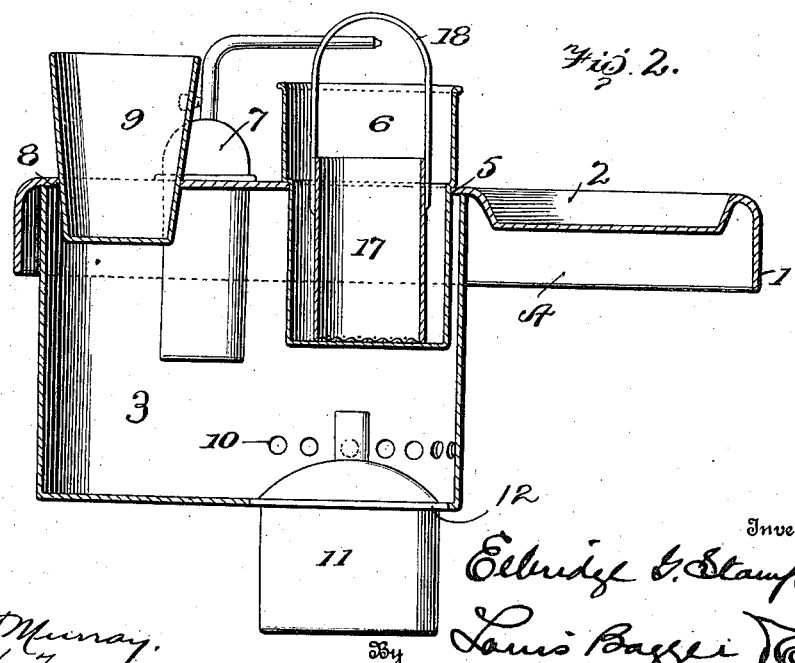

In the accompanying drawings—Figure 1 is a perspective view; Fig. 2 is a longitudinal, vertical section; Fig. 3 is a view of the receptacle which may be received in the sterilizing cup; Fig. 4 is a view of the annealer; Fig. 5 is a detailed view of the door, which is connected to the side of the heating receptacle, and Fig. 6 is a top plan view of the device.

A represents a tray which is provided with a downwardly turned flange 1. A depression 2 is formed at one end of the tray for the reception of instruments. A heating chamber 3 is connected to the tray by means of bolts 4, 4 on the underside of the tray. An opening 5 is formed in the tray, in which the sterilizing receptacle 6 is received, permitting it to extend down into the heating chamber 3, the receptacle 6 being so constructed by flanged or bulged surface at or near the top thereof that it is permitted to rest on the tray. Openings 6ª are also formed in the tray for the spray bottles 7, whereby they are permitted to extend into the heating chamber 3. Another opening 8 is formed, in which an ordinary glass 9 is received, whereby the contents of the glass may be heated. Around the surface of the heating chamber for a short distance are perforations 10 to permit the products of combustion to escape from the heating chamber. A lamp 11 or other heating means is supported in the bottom of the heating chamber, and openings 12 are formed to permit of the admission of air to the lamp. An opening 13 is formed in the side of the receptacle above the heating chamber, and covering the opening is a door or cover 14, which is provided with a shank 15, which passes through an opening 16 in the receptacle for holding the cover in proper position and permitting it to be raised and held out of the way when it is desired to heat guttapercha or metal quickly over the lamp. The sterilizing receptacle 6 is adapted to receive a receptacle 17, which is provided with a perforated or sieve bottom in which are received instruments to be sterilized. A handle 18 is connected to the receptacle to permit of its removal.

An annealer, which is composed of a bottom 19 and a bail 20, is adapted to be received in the opening 5 by removing the sterilizing receptacle 6 for annealing or heating gold. The receptacle is supported within the receptacle 3 by projections 21 formed on the bail 20, which are adapted to rest on the tray. This permits of the bottom 19 coming directly over the heating means whereby the gold can be thoroughly heated.

From the foregoing it will be seen that I have provided a device whereby instruments may be sterilized, liquid heated for different purposes, and gold annealed and gutta percha heated. In fact, a device of this character would be of material assistance to dentists in preparing their preparations for use, and the fact that an instrument can be sterilized instantly as the water is being constantly heated is a great advantage and the water is always ready for other purposes.

More or less slight changes might be made in the form and arrangement of the several parts described without departing from the spirit and scope of my invention, and hence I do not wish to be limited to the exact construction herein set forth, but:

Having fully described my invention, what I claim as new and desire to secure by Letters Patent is:

A combined sterilizer and water-heater comprising a tray having openings therein, a heating chamber removably connected to the lower side of the tray, said heating chamber having an opening formed in the bottom and side thereof, a door for closing the opening in the side of the chamber, a heater extending through the opening in the bottom of the chamber and supported by the chamber, and receptacles adapted to extend through the openings in the tray into the heating chamber, said receptacles being supported by the tray.

In testimony whereof I affix my signature, in the presence of two witnesses.

ELBRIDGE G. STAMPER.

Witnesses:
FRANK A. LUCAS,
EDGAR W. WHITTEMORE.